(12) United States Patent
Zhang

(10) Patent No.: US 10,345,769 B2
(45) Date of Patent: Jul. 9, 2019

(54) METHOD AND APPARATUS FOR CONTROLLING SMART HOME DEVICE

(71) Applicant: LENOVO (BEIJING) LIMITED, Beijing (CN)

(72) Inventor: Jinfeng Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 228 days.

(21) Appl. No.: 14/755,418

(22) Filed: Jun. 30, 2015

(65) Prior Publication Data

US 2016/0266557 A1  Sep. 15, 2016

(30) Foreign Application Priority Data

Mar. 9, 2015  (CN) .......................... 2015 1 0103165

(51) Int. Cl.
*G05B 15/02* (2006.01)
*G06N 5/02* (2006.01)

(52) U.S. Cl.
CPC ...... *G05B 15/02* (2013.01); *G05B 2219/2642* (2013.01); *G06N 5/025* (2013.01)

(58) Field of Classification Search
CPC ...... G05B 15/02; G05B 13/026; G05N 5/046; H02J 3/28; H02J 3/00; H02J 3/12; H02J 13/0006; H02J 3/01; H02J 3/382; G05F 1/66; H02M 1/42
USPC ....................................................... 700/275
See application file for complete search history.

(56) References Cited

U.S. PATENT DOCUMENTS

| | | | | |
|---|---|---|---|---|
| 5,510,975 A | * | 4/1996 | Ziegler, Jr. ........... | G05B 13/028 700/49 |
| 6,237,854 B1 | * | 5/2001 | Avni ...................... | F24F 11/001 165/236 |
| 6,823,223 B2 | * | 11/2004 | Gonzales ............. | G05B 19/042 315/297 |
| 7,891,203 B1 | * | 2/2011 | Burns ................ | B60H 1/00592 62/115 |
| 7,925,383 B2 | * | 4/2011 | Kwon ................... | F24F 11/006 700/19 |
| 8,136,738 B1 | * | 3/2012 | Kopp ................... | F24F 11/0034 165/237 |

(Continued)

FOREIGN PATENT DOCUMENTS

CN   101594251 A   12/2009
CN   201464897 U   5/2010
(Continued)

*Primary Examiner* — Brian W Wathen
*Assistant Examiner* — Mohammed Shafayet
(74) *Attorney, Agent, or Firm* — Scully Scott Murphy & Presser

(57) ABSTRACT

The application provides a method and an apparatus for controlling a smart home device. The method includes: obtaining a first linkage rule for controlling a first response device to enter into a first state based on a first parameter of a first condition device; traversing a plurality of linkage rules to search linkage rules matching a second state of the first response device and generating a second linkage rule based on a preset strategy in case that no linkage rule matching the second state is found, the second linkage rule is operable to control the first response device to enter into the second state based on a second parameter of a second condition device.

10 Claims, 3 Drawing Sheets

(56) References Cited

U.S. PATENT DOCUMENTS

| | | | | |
|---|---|---|---|---|
| 8,490,006 | B1* | 7/2013 | Reeser | G05B 15/02 700/18 |
| 9,076,111 | B2* | 7/2015 | Delorme | G06Q 10/06 |
| 9,311,586 | B2* | 4/2016 | Robinette | G08B 13/1427 |
| 2003/0040813 | A1* | 2/2003 | Gonzales | H01H 15/005 700/19 |
| 2004/0163073 | A1* | 8/2004 | Krzyzanowski | H04L 12/2803 717/107 |
| 2006/0064720 | A1* | 3/2006 | Istvan | H04N 5/44543 725/38 |
| 2006/0142968 | A1* | 6/2006 | Han | A61B 5/0205 702/120 |
| 2007/0061020 | A1* | 3/2007 | Bovee | H04L 12/282 700/19 |
| 2008/0186148 | A1* | 8/2008 | Kwon | F24F 11/006 340/286.02 |
| 2009/0121842 | A1* | 5/2009 | Elberbaum | G08C 17/02 340/10.5 |
| 2010/0289643 | A1* | 11/2010 | Trundle | F24F 11/0086 340/545.1 |
| 2011/0153107 | A1* | 6/2011 | Kim | G06F 1/3203 700/295 |
| 2011/0157476 | A1* | 6/2011 | Arling | H04L 12/2805 348/731 |
| 2012/0065802 | A1* | 3/2012 | Seeber | G06F 1/3203 700/295 |
| 2012/0158628 | A1* | 6/2012 | Junker | G06F 19/00 706/14 |
| 2012/0173537 | A1* | 7/2012 | Shaffer | H04M 3/4228 707/741 |
| 2013/0066474 | A1* | 3/2013 | Coogan | F24F 11/0012 700/278 |
| 2013/0073094 | A1* | 3/2013 | Knapton | F24F 11/0034 700/278 |
| 2013/0085609 | A1* | 4/2013 | Barker | G05B 15/02 700/276 |
| 2013/0085615 | A1* | 4/2013 | Barker | A61G 10/00 700/277 |
| 2013/0131870 | A1* | 5/2013 | Zerhusen | A47B 23/046 700/275 |
| 2013/0173062 | A1* | 7/2013 | Koenig-Richardson | G06Q 10/00 700/275 |
| 2014/0075967 | A1* | 3/2014 | Arensmeier | F24F 13/222 62/56 |
| 2014/0135998 | A1* | 5/2014 | Cao | F24F 11/0012 700/278 |
| 2014/0229075 | A1* | 8/2014 | Lopez | B60H 1/0065 701/45 |
| 2014/0297054 | A1* | 10/2014 | Tsai | H02J 3/14 700/295 |
| 2014/0306833 | A1* | 10/2014 | Ricci | B60Q 1/00 340/901 |
| 2014/0309789 | A1* | 10/2014 | Ricci | B60Q 1/00 700/276 |
| 2014/0316583 | A1* | 10/2014 | Ambriz | F24F 11/0012 700/277 |
| 2015/0073568 | A1* | 3/2015 | Jun | G05B 15/02 700/19 |
| 2015/0134585 | A1* | 5/2015 | Chen | G06N 5/025 706/48 |
| 2015/0160634 | A1* | 6/2015 | Smith | G05B 11/01 700/90 |
| 2015/0283878 | A1* | 10/2015 | Rose | B60H 1/00735 701/36 |
| 2015/0293509 | A1* | 10/2015 | Bankowski | G05B 15/02 700/275 |
| 2015/0324706 | A1* | 11/2015 | Warren | H04L 12/2803 700/275 |
| 2015/0349976 | A1* | 12/2015 | Toutain | H04L 12/2838 700/275 |
| 2016/0070251 | A1* | 3/2016 | Brown | G05B 19/4185 700/86 |
| 2016/0112240 | A1* | 4/2016 | Sundaresan | H04L 67/306 726/1 |
| 2016/0187899 | A1* | 6/2016 | Lee | G05D 22/02 236/44 C |
| 2016/0252266 | A1* | 9/2016 | Ushirosako | F24D 19/1084 700/278 |
| 2017/0076263 | A1* | 3/2017 | Bentz | F24F 11/0086 |

FOREIGN PATENT DOCUMENTS

| | | |
|---|---|---|
| CN | 102736599 A | 10/2012 |
| CN | 202995383 U | 6/2013 |
| CN | 104133386 A | 11/2014 |
| CN | 104216379 A | 12/2014 |

* cited by examiner

METHOD AND APPARATUS FOR CONTROLLING SMART HOME DEVICE

CROSS-REFERENCE TO RELATED APPLICATION(S)

This application claims priority to Chinese Application No. 201510103165.6, filed on Mar. 9, 2015, which is incorporated herein by reference in its entirety.

TECHNICAL FIELD

The present application relates to the field of electronic techniques, and particularly to method and apparatus for controlling smart home device.

BACKGROUND

The application scenes of the internet of things (IOT) have been richened with the development of sciences and techniques. Smart home embodies the interconnection of things affected by the IOT. This smart home takes the residence as a platform, integrates home life related devices by utilizing various techniques such as integrated wiring techniques, network communication techniques and automatically controlling techniques, and constructs an efficient management system for the home devices and home daily events, improving the security, the facilitation and the comfort of the home life and achieving an energy-saved living environment.

When a user wants to configure some linkage scenes in the prior art, he or she usually configure some linkage rules for the linkage scenes. When corresponding linkage conditions are satisfied, some preset operations configured in the linkage rules will be performed so as to smartly control the home environment. The configured linkage rules should cover all the possible states of a certain attribute of a device in order to periodically perform the rules. For example, if the user wants to control the illumination of a fluorescent lamp, linkage rules for two states (i.e. ON and OFF) of the fluorescent lamp should be configured respectively. As an example, a first rule specifies that the lamp is turned on when it is getting dark; a second rule specifies the lamp is turned off when it is getting light. Thereby the fluorescent lamp is periodically turned on and turned off under the control of the linkage rules.

The inventors of the application, when implementing the approaches of the embodiments of the present application, have found that:

The conventional electronic device achieves the linkage of scenes by means of manually configuring linkage rules for the electronic device by the user. In case that the linkage rules configured by the user cannot cover all device states of the electronic device, the linkage of scenes for the electronic device cannot be achieved. Therefore, the electronic device cannot detect whether the configured linkage rules cover all the device states of the electronic device or not.

Furthermore, if the configured linkage rules fail to cover all the device states of the electronic device, the electronic device cannot automatically generate linkage rules corresponding to the uncovered device states Since the conventional electronic device achieves the linkage of scenes only by means of manually configuring the linkage rules for the electronic device by the user, for the device states uncovered by the configured linkage rules, the user has to manually configure linkage rules, which is inefficient and is easy to miss some of them, resulting in poor user experience.

SUMMARY

One aspect of the embodiment of the application provides a method for controlling a smart home device. The method comprises: obtaining a first linkage rule for controlling a first response device to enter into a first state based on a first parameter of a first condition device; traversing a plurality of linkage rules to search linkage rules matching a second state of the first response device; and generating a second linkage rule based on a preset strategy in case that no linkage rule matching the second state is found, the second linkage rule is operable to control the first response device to enter into the second state based on a second parameter of a second condition device.

Optionally, before obtaining the first linkage rule, the method further comprises: connecting a plurality of smart home devices; and obtaining device information of each one of the plurality of smart home devices, the device information comprises the first parameter of the first condition device, the first state and the second state of the first response device. Each of the first condition device, the second condition device and the first response device comprises at least one smart home device determined from the plurality of smart home devices.

Optionally, generating the second linkage rule based on the preset strategy in case that no linkage rule matching the second state is found, particularly comprises:
selecting a smart home device corresponding to an execution condition parameter of any one of the plurality of linkage rules as the second condition device; and generating the second linkage rule for controlling the first response device to enter into the second state based on a second parameter of the second condition device.

Optionally, generating the second linkage rule based on the preset strategy in case that no linkage rule matching the second state is found particularly comprises: obtaining first usage information of the first response device during a first duration of time; determining, based on the first usage information, a parameter to which the second condition device corresponds when the second condition device is in the second state during the first duration of time and selecting the parameter as the second parameter; and generating the second linkage rule for controlling the first response device to enter into the second state based on the second parameter.

Optionally, after generating the second linkage rule based on the preset strategy in case that no linkage rule matching the second state is found, the method further comprises: based on the second linkage rule, generating and outputting first prompt information for prompting the user to create the second linkage rule corresponding to the second state, the first prompt information contains the second linkage rule.

Another aspect of the embodiments of the application provides a control apparatus. The control apparatus comprises: a housing; a storage for storing at least one program modules; at least one processor arranged in the housing, the at least one processor, by obtaining and running the at least one program modules, being configured to:
obtain a first linkage rule for controlling a first response device to enter into a first state based on a first parameter of a first condition device;
traverse a plurality of linkage rules to search linkage rules matching a second state of the first response device; and generate a second linkage rule based on a preset strategy in case that no linkage rule matching the second state is found. The second linkage rule is operable to control the first response device to enter into the second state based on a second parameter of a second condition device.

Optionally, before the first linkage rule configured by a user is obtained, the at least one processor is further configured to: connect a plurality of smart home devices; and obtain device information of each one of the plurality of smart home devices. The device information comprises the first parameter of the first condition device, the first state and the second state of the first response device. Each of the first condition device, the second condition device and the first response device comprises at least one smart home device determined from the plurality of smart home devices.

Optionally, the at least one processor is particularly configured to: select a smart home device corresponding to an execution condition parameter of any one of the plurality of linkage rules as the second condition device; and generate the second linkage rule for controlling the first response device to enter into the second state based on a second parameter of the second condition device.

Optionally, the at least one processor is further configured to: obtain first usage information of the first response device during a first duration of time; determine, based on the first usage information, a parameter to which the second condition device corresponds when the second condition device is in the second state during the first duration of time and select the parameter as the second parameter; and generate the second linkage rule for controlling the first response device to enter into the second state based on the second parameter.

Optionally, after the second linkage rule is generated based on a preset strategy in case that no linkage rule matching the second state is found, the at least one processor is further configured to: generate, based on the second linkage rule, and output first prompt information for prompting the user to create the second linkage rule corresponding to the second state, the first prompt information contains the second linkage rule.

BRIEF DESCRIPTION OF THE DRAWINGS

In order to more clearly explain the approaches in the prior art or in the embodiments of the application, figures required to be used in the embodiments will be explained briefly below. It is obviously that the following figures are only some embodiments of the application.

DETAILED DESCRIPTION

Figure 1:
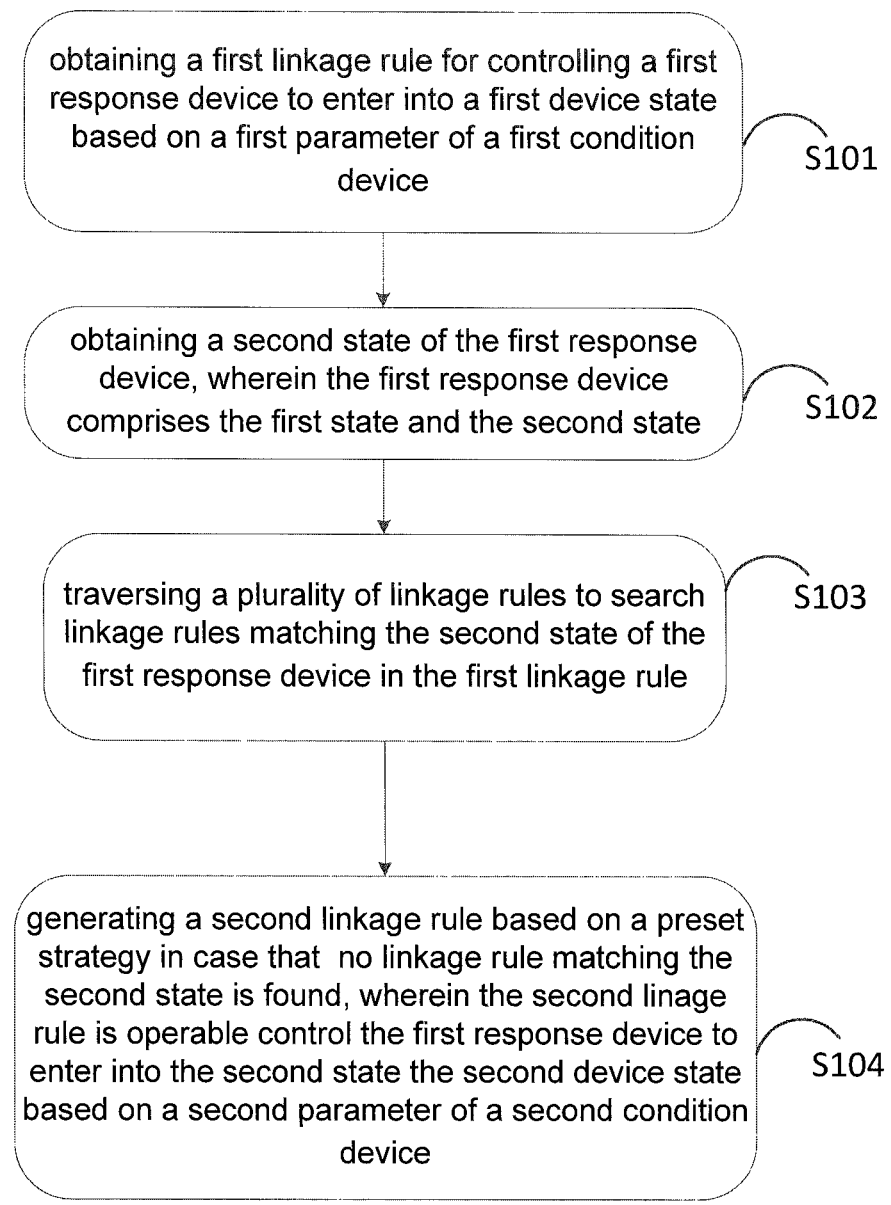
FIG. 1 is a flowchart of the method for controlling a smart home device based on linkage rules provided by the first embodiment of the application.

In order to address the technical problem in the prior art solutions that the electronic device cannot detect whether the configured linkage rules cover all the device states of the electronic device or not, embodiments of the application provides a method and an apparatus for controlling a smart home device based on linkage rules. The embodiments of the application achieves the technical effect of automatically detecting the completeness of the configured linkage rules.

The general idea of the solutions in the embodiments of the application for address the above technical problem is proposed as follows:

obtaining a first linkage rule configured by a user, wherein the first linkage rule is use to control a first response device to enter into a first state based on a first parameter of a first condition device;

obtaining a second state of the first response device, wherein the first response device comprises the first state and the second state;

traversing a plurality of linkage rules to search linkage rules matching the second state of the first response device in the first linkage rule; and generating a second linkage rule based on a preset strategy in case that no linkage rule matching the second state is found, wherein the second linkage rule is use to control the first response device to enter into the second state based on a second parameter of a second condition device.

In the above solution, the following technical means is adopted: obtaining a first linkage rule configured by a user, wherein the first linkage rule is use to control a first response device to enter into a first state based on a first parameter of a first condition device, obtaining a second state of the first response device, and traversing a plurality of linkage rules to search linkage rules matching the second state of the first response device in the first linkage rule. As such, when the electronic device obtains a linkage rule, it will automatically traverse all of linkage rules stored in the electronic device to search linkage rules related to the device states of the response device in the obtained linkage rule. As such, the electronic device can detect whether the stored linkage rules cover all the device states of the response device, and thus judge the completeness of the linkage rules. Such a solution efficiently addresses the technical problem of the electronic device in the art that it cannot detect whether the configured linkage rules cover all of the device states of the electronic device, and achieves the technical effect of automatically detecting the completeness of the configured linkage rules.

In order to more clearly explain the purpose, the solutions and the advantages of embodiments of the application, the solutions of the application will be explained below clearly and completely by referring to the accompanying figures of the application. Obviously, the described embodiments are only part of, rather than all of, embodiments of the solutions of the application. Other embodiments which can be made by one with ordinary skills in the art without any inventive effort should fall into the protection scope of the solutions of the application.

The First Embodiment

FIG. 1 shows a flowchart of the method for controlling a smart home device based on linkage rules provided by the first embodiment of the application. The method comprises the following steps.

In step S101, a first linkage rule configured by a user is obtained, wherein the first linkage rule is use to control a first response device to enter into a first state based on a first parameter of a first condition device.

In step S102, a second state of the first response device is obtained, wherein the first response device comprises the first state and the second state;

In step S103, traversing of a plurality of linkage rules is performed to search linkage rules matching a second state of the first response device in the first linkage rule based on the second state of the first response device in the first linkage.

In step S104, a second linkage rule is generated based on a preset strategy in case that no linkage rule matching the second state is found, wherein the second linkage rule is use to control the first response device to enter into the second state based on a second parameter of a second condition device.

In an embodiment of the application, the method for controlling a smart home device based on linkage rules may be applied to a centre controlling device in the home such as a gateway, a smart router or a cloud controlling device, or be applied to other electronic devices with some processing capacities. The gateway, the smart router or the cloud controlling device can be used to control electronic devices connected thereto, such as air conditions, refrigerators, lamps, and so on. In the first embodiment of the application, taking the gateway or the smart router controlling the smart home devices as an example, a particular implementation of the method of the embodiment of the application will be described in detail.

Before step S101 of the embodiment of the application was performed, the method of embodiment of the application further comprises steps of:

connecting a plurality of smart home devices; and
obtaining device information of each one of the plurality of smart home devices;
wherein the device information particularly comprises the first parameter of the first condition device, the first state and the second state, and wherein the first condition device particularly comprises at least one smart home device determined from the plurality of smart home devices, the second condition device particularly comprises at least one smart home device determined from the plurality of smart home devices, the first response device particularly comprises at least one smart home device determined from the plurality of smart home devices.

In a particular implementation, the gateway or the smart router connects to all the devices in the home environment, and each of the home devices interconnects each other via the gateway or the smart router. For example, the gateway or the smart router connects to devices such as the doors, the windows, the lamps and the air conditions. Meanwhile, the gateway or the smart router may be provided with a parameter collection unit such as a sensor or a camera, so that the gateway or the smart router can monitor environment parameters of the home environment in real time. Since the gateway or the smart router connects to all the devices in the home environment, it can also obtain the device information of all the home devices. For example, the gateway or the smart router may have knowledge that the states of a lamp comprise two states (power-on and power off), that the temperature control scope of the air condition is 16-30° C., that the states of a door comprise two states (open and close), and so on. The gateway or the smart router may further detect the environment parameters of the environment where a home device is located by means of a sensor mounted thereon. For example, a temperature sensor may detect that the temperature where the air condition is located is 30° C.

In the embodiment of the application, the first condition device, the second condition device and the first response device can be any one or more of the home devices. They may be the same, or may be different. For example, the door and window can be collectively determined as the first condition device, the door and the air condition can be determined as the second condition device, and the lamp can be determined as the first response device, etc. In a particular implementation, the user may make flexible configuration according to the actual usage requirement, which will not be limited in the embodiment of the application. The first parameter and the second parameter can be device states of the home devices or environment parameters of the environment where the home device is located. For example, when the first condition device is an air condition, the first parameter may be the power-on state and the power-off state of the air condition, or may be the current temperature of the environment where the air condition is located which may be detected by the gateway or the smart router, which will not be limited in the embodiment of the application.

In the embodiment of the application, considering an exemplary case where a door is the first condition device, an air condition is the second condition device and a humidifier is the first response device, a particular implementation of the method of the embodiment of the application will be described below.

Firstly, the step S101 of the method of the embodiment of the application is performed, i.e. a first linkage rule configured by a user is obtained, wherein the first linkage rule is use to control a first response device to enter into a first state based on a first parameter of a first condition device.

In a particular implementation, a gateway or a smart router is used to control smart home devices, a door is the first condition device, an air condition is the second condition device and a humidifier is the first response device. The user can configure a linkage rules directly for the humidifier. For example, a linkage rule may specify that the humidifier powers on when the door opens. Then the humidifier may send the linkage rules to the gateway or the smart router. Alternatively, a portable device such as the mobile phone of the user is used to send the linkage rule "the humidifier powers on when the door opens" to the gateway or the smart router. The gateway or the smart router may store a plurality of linkage rules for all of the home devices in a home.

After step S101 is performed, the method of the embodiment of the application performs step S102, i.e. obtaining a second state of the first response device, wherein the first response device comprises the first state and the second state.

In a particular implementation, still taking the above case as an example, when the gateway or the smart router receives the linkage rule "the humidifier powers on when the door opens," it determines the humidifier as the first response device. Now the gateway or the smart router retrieves device states corresponding to the humidifier from its own storage unit, i.e. power-on state and power-off state. The device state of the humidifier other than the power-on state (i.e. the power-off state) is determined as the second state.

After step S102 is performed, the method of the embodiment of the application performs step S103, i.e. traversing a plurality of linkage rules to search linkage rules matching the second state of the first response device in the first linkage rule.

In a particular implementation, taking the above case as an example, when the gateway or the smart router determines that the second state of the humidifier is the power-off state, the gateway or the smart router matches it with linkage rules stored in its own storage unit, and determines whether there is another linkage rule to control the humidifier to enter into the power off state.

After step S103 is performed, the method of the embodiment of the application performs step S104, i.e. generating a second linkage rule based on a preset strategy in case that no linkage rule matching the second state is found, wherein the second linkage rule is use to control the first response device to enter into the second state based on a second parameter of a second condition device.

In the embodiment of the application, there may be two implementations for step S104.

Figure 2:
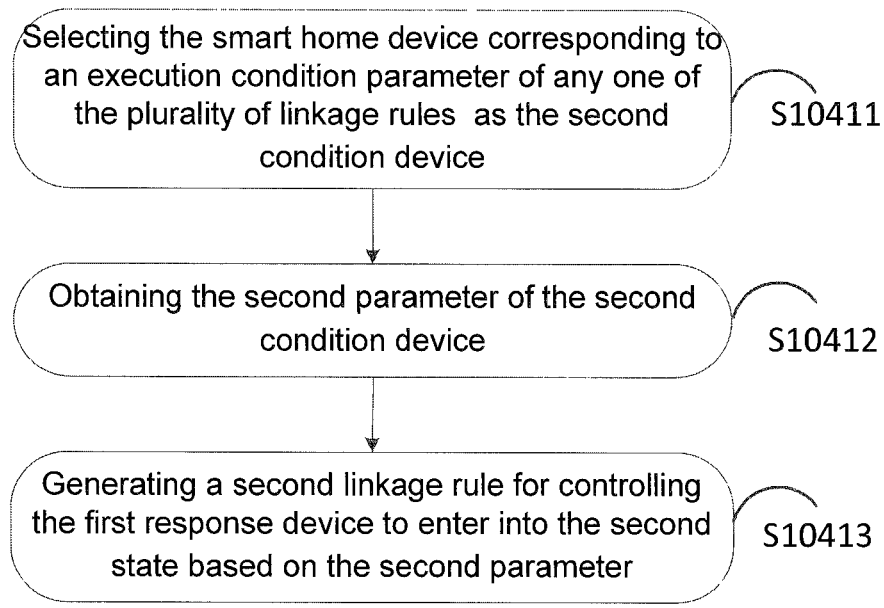
FIG. 2 is a flowchart of the first implementation of step S104 of the first embodiment of the application.

The First Implementation:

Referring to FIG. 2, the implementation of step S104 is provided as follows.

In step S10411, the smart home device corresponding to an execution condition parameter of any one of the plurality of linkage rules is selected as the second condition device.

In step S10412, the second parameter of the second condition device is obtained; and In step S10413, a second linkage rule for controlling the first response device to enter into the second state based on the second parameter is generated.

In a particular implementation, taking the above case as an example, when the gateway or the smart router determines that none of the existing linkage rules can controls the humidifier to enter into the second state, the gateway or the smart router can determine linkage rules associated with the humidifier from the plurality of linkage rules stored in its own storage unit, and can determine the home device corresponding to the execution condition in the associated linkage rules as the second condition device. For example, if one of the linkage rules stored in the gateway or the smart router is "the humidifier powers on when the air condition powers off," the gateway or the smart router may determine the air condition as the second condition device, or any of the linkage rules can be selected and the home device corresponding to the execution condition of the selected linkage rule may be determined as the second condition device, which will not be limited in the embodiment of the application. Then the device states of the air condition are obtained, which comprises the power-on state and the power-off state. The gateway or the smart router may learn from the device information of the air condition that the air condition also has certain humidification capability. Accordingly the power-on state of the air condition is determined as the condition for controlling the humidifier to enter into the power-off state, and thus the second linkage rule "the humidifier powers off when the air condition powers on" is generated.

When the gateway or the smart router determines that none of the existing linkage rules can control the humidifier to enter into the second state, the gateway or the smart router may select any of the linkage rules, and the home device corresponding to the execution condition of the selected linkage rule may be determined as the second condition device. As an example, one of the linkage rule stored in the gateway or the smart router is "the door is closed when the lamp power on." Then the lamp is determined as the second condition device. The gateway or the smart router may learn from the device information of the lamp that there is no obvious relationship between the lamp and the humidifier, and then the gateway or the smart router determines the humidity of the environment where the lamp is located, which is detected by a sensor of the gateway or the smart router, as the second parameter, and generates the second linkage rule "the humidifier powers on when the humidity of the environment where the lamp is located is below 30% RH."

Figure 3:
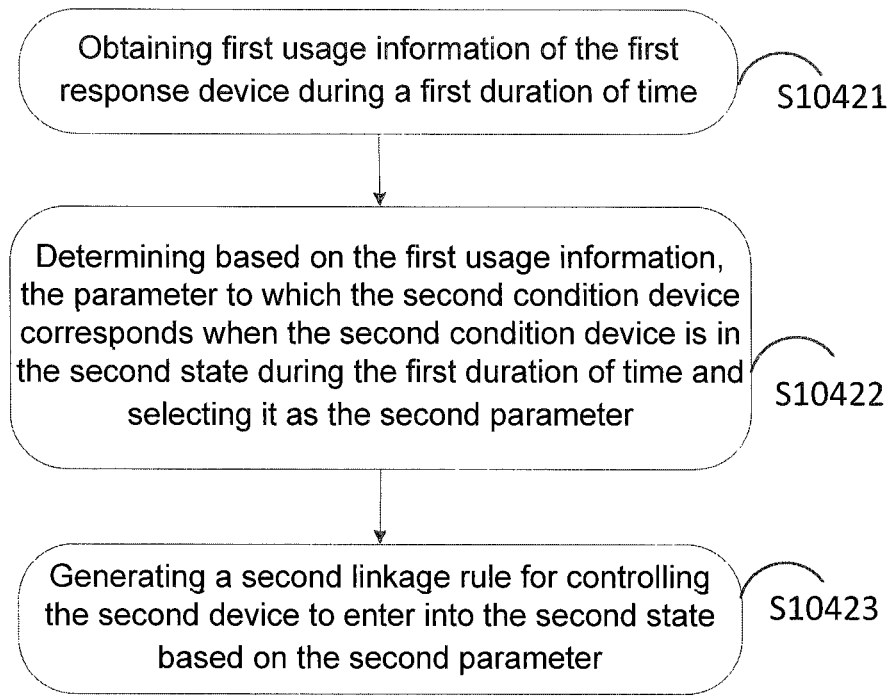
FIG. 3 is a flowchart of the second implementation of step S104 of the first embodiment of the application.

The Second Implementation:

Referring to FIG. 3, the implementation of step S104 is provided as follows:

In step S10421, first usage information of the first response device during a first duration of time is obtained.

In step S10422, based on the first usage information, the parameter to which the second condition device corresponds when the second condition device is in the second state during the first duration of time as the second parameter is determined and selected as the second parameter.

In step S10423, a second linkage rule for controlling the first response device to enter into the second state based on the second parameter is generated.

In a particular implementation, taking the above case as an example, when the gateway or the smart router determines that none of the existing linkage rules can controls the humidifier to enter into the second state, the gateway or the smart router learns, from the usage information of the humidifier in the latest month which is store in the storage unit of the gateway or the smart router, the parameter information of other home devices when the humidifier is in the power-off state. For example, the usage information of the humidifier stored in the gateway or the smart router shows that the states corresponding to the air condition are always power-on state when the humidifier is in the power-off state. Then the gateway or the smart router generates the second linkage rule "the humidifier powers off when the air condition powers on."

After step S104 is performed, the method of the embodiment of the application may further comprises:

based on the second linkage rule, generating and outputting first prompt information for prompting the user to confirm whether the generated second linkage rule should be saved or not, wherein the first prompt information contains the second linkage rule.

In a particular implementation, taking the above case as an example, when the gateway or the smart router generates the second linkage rule corresponding to the humidifier, the gateway or the smart router may generate prompt information containing the second linkage rule, such as "whether to generate a linkage rule 'the humidifier powers off when the air condition powers on'." This prompt information is then sent to the mobile phone of the user or another electronic device to view by the user. The user may operate based on the shown prompt information to determine whether to generate the second linkage rule or not.

The Second Embodiment

FIG. 1 shows a flowchart of the method for controlling a smart home device based on linkage rules provided by the first embodiment of the application. The method comprises the following steps.

In step S101, a first linkage rule configured by a user is obtained, wherein the first linkage rule is use to control a first response device to enter into a first state based on a first parameter of a first condition device.

In step S102, a second state of the first response device is obtained, wherein the first response device comprises the first state and the second state;

In step S103, traversing of a plurality of linkage rules is performed to search linkage rules matching a second state of the first response device in the first linkage rule based on the second state of the first response device in the first linkage.

In step S104, a second linkage rule is generated based on a preset strategy in case that no linkage rule matching the second state is found, wherein the second linkage rule is use to control the first response device to enter into the second state based on a second parameter of a second condition device.

In an embodiment of the application, the method for controlling a smart home device based on linkage rules may be applied to a centre controlling device in the home such as a gateway, a smart router or a cloud controlling device, or be applied to other electronic devices with some processing capacities. The gateway, the smart router or the cloud controlling device can be used to control electronic devices connected thereto, such as air conditions, refrigerators, lamps, and so on. In the second embodiment of the application, taking the cloud controlling device controlling the smart home devices as an example, a particular implementation of the method of the embodiment of the application will be described in detail.

Before step S101 of the embodiment of the application was performed, the method of embodiment of the application further comprises steps of:

connecting a plurality of smart home devices; and
obtaining device information of each one of the plurality of smart home devices;
wherein the device information particularly comprises the first parameter of the first condition device, the first state and the second state, and wherein the first condition device particularly comprises at least one smart home device determined from the plurality of smart home devices, the second condition device particularly comprises at least one smart home device determined from the plurality of smart home devices, the first response device particularly comprises at least one smart home device determined from the plurality of smart home devices.

In a particular implementation, the home devices need to be connected to the cloud controlling device via the gateway or the smart router wherein the gateway or the smart router provides only the function of routing addresses. For example, the cloud controlling device connects to devices such as the doors, the windows, the lamps and the air conditions via the gateway or the smart router. Since the cloud controlling device connects to all the home devices via the gateway or the smart router, it can also obtain the device information of all the home devices. For example, the cloud controlling device may, via the gateway or the smart router, have knowledge that the states of a lamp comprise two states (power-on and power off), that the temperature control scope of the air condition is 16-30° C., that the states of a door comprise two states (open and close), and so on.

In the embodiment of the application, the first condition device, the second condition device and the first response device can be any one or more of the home devices. They may be the same, or may be different. For example, the door and window can be collectively determined as the first condition device, the door and the air condition can be determined as the second condition device, and the lamp can be determined as the first response device, etc. In a particular implementation, the user may make flexible configuration according to the actual usage requirement, which will not be limited in the embodiment of the application. The first parameter and the second parameter can be device states of the home devices or environment parameters of the environment where the home device is located. For example, when the first condition device is an air condition, the first parameter may be the power-on state and the power-off state of the air condition, or may be the current temperature of the environment where the air condition is located which may be detected by a temperature sensor, which will not be limited in the embodiment of the application.

In the embodiment of the application, considering an exemplary case where a door is the first condition device, an air condition is the second condition device and a humidifier is the first response device, a particular implementation of the method of the embodiment of the application will be described below.

Firstly, the step S101 of the method of the embodiment of the application is performed, i.e. a first linkage rule configured by a user is obtained, wherein the first linkage rule is use to control a first response device to enter into a first state based on a first parameter of a first condition device.

In a particular implementation, a cloud controlling device is used to control smart home devices, a door is the first condition device, an air condition is the second condition device and a humidifier is the first response device as an example. The user can configure linkage rules directly for the humidifier, such as a linkage rule "the humidifier powers on when the door opens". Then the humidifier may send the linkage rule to the gateway or the smart router which in turn sends this linkage rule to the cloud controlling device. Alternatively, a portable device such as the mobile phone of the user is used to send the linkage rule "the humidifier powers on when the door opens" to the gateway or the smart router which in turn stores the received linkage rule to the cloud controlling device. The cloud controlling device may store a plurality of linkage rules for all of the home devices in a home.

After step S101 is performed, the method of the embodiment of the application performs step S102, i.e. obtaining a second state of the first response device, wherein the first response device comprises the first state and the second state.

In a particular implementation, still taking the above case as an example, when the cloud controlling device receives the linkage rule "the humidifier powers on when the door opens," it determines the humidifier as the first response device. Now the cloud controlling device retrieves device states corresponding to the humidifier from its own storage unit, i.e. power-on state and power-off state. The device state of the humidifier other than the power-on state (i.e. the power-off state) is determined as the second state.

After step S102 is performed, the method of the embodiment of the application performs step S103, i.e. traversing a plurality of linkage rules to search linkage rules matching the second state of the first response device in the first linkage rule.

In a particular implementation, taking the above case as an example, when the cloud controlling device determines that the second state of the humidifier is the power-off state, the cloud controlling device matches it with linkage rules stored in its own storage unit, and determines whether there is another linkage rule to control the humidifier to enter into the power off state.

After step S103 is performed, the method of the embodiment of the application performs step S104, i.e. generating a second linkage rule based on a preset strategy in case that no linkage rule matching the second state is found, wherein the second linkage rule is use to control the first response device to enter into the second state based on a second parameter of a second condition device.

In the embodiment of the application, there may be two implementations for step S104.

The First Implementation:

Referring to FIG. 2, the implementation of step S104 is provided as follows.

In step S10411, the smart home device corresponding to an execution condition parameter of any one of the plurality of linkage rules is selected as the second condition device.

In step S10412, the second parameter of the second condition device is obtained; and In step S10413, a second linkage rule for controlling the first response device to enter into the second state based on the second parameter is generated.

In a particular implementation, taking the above case as an example, when the cloud controlling device determines that none of the existing linkage rules can controls the humidifier to enter into the second state, the cloud controlling device can determine linkage rules associated with the humidifier from the plurality of linkage rules stored in its own storage unit, and can determine the home device corresponding to the execution condition in the associated linkage rules as the second condition device. For example, if one of the linkage rules stored in the cloud controlling device is "the humidifier powers on when the air condition powers off," the cloud controlling device may determine the air condition as the second condition device, or any of the linkage rules can be selected and the home device corresponding to the execution condition of the selected linkage rule may be determined as the second condition device, which will not be limited in the embodiment of the application. Then the device states of the air condition are obtained, which comprises the power-on state and the power-off state. The cloud controlling device may learn from the device information of the air condition that the air condition also has certain humidification capability. Accordingly the power-on state of the air condition is determined as the condition for controlling the humidifier to enter into the power-off state, and thus the second linkage rule "the humidifier powers off when the air condition powers on" is generated.

When the cloud controlling device determines that none of the existing linkage rules can controls the humidifier to enter into the second state, the cloud controlling device may select any of the linkage rules and the home device corresponding to the execution condition of the selected linkage rule may be determined as the second condition device. As an example, one of the linkage rule stored in the cloud controlling device is "the door is closed when the lamp power on." Then the lamp is determined as the second condition device. The cloud controlling device may learn from the device information of the lamp that there is no obvious relationship between the lamp and the humidifier, and then the cloud controlling device determines the humidity of the environment where the lamp is located, which is detected by a humidity sensor and sent by the gateway or the smart router, as the second parameter, and generates the second linkage rule "the humidifier powers on when the humidity of the environment where the lamp is located is below 30% RH."

The Second Implementation:

Referring to FIG. 3, the implementation of step S104 is provided as follows,

In step S10421, first usage information of the first response device during a first duration of time is obtained.

In step S10422, based on the first usage information, the parameter to which the second condition device corresponds when the second condition device is in the second state during the first duration of time as the second parameter is determined and selected as the second parameter.

In step S10423, a second linkage rule for controlling the first response device to enter into the second state based on the second parameter is generated.

In a particular implementation, taking the above case as an example, when the cloud controlling device determines that none of the existing linkage rules can controls the humidifier to enter into the second state, the cloud controlling device learns, from the usage information of the humidifier in the latest month which is store in the storage unit of the cloud controlling device and sent by the gateway or the smart router, the parameter information of other home devices when the humidifier is in the power-off state. For example, the usage information of the humidifier stored in the storage unit of the cloud controlling device shows that the states corresponding to the air condition are always power-on state when the humidifier is in the power-off state. Then the cloud controlling device generates the second linkage rule "the humidifier powers off when the air condition powers on."

After step S104 is performed, the method of the embodiment of the application may further comprises:

based on the second linkage rule, generating and outputting first prompt information for prompting the user to confirm whether the generated second linkage rule should be saved or not, wherein the first prompt information contains the second linkage rule.

In a particular implementation, taking the above case as an example, when the cloud controlling device generates the second linkage rule corresponding to the humidifier, the cloud controlling device may generates prompt information containing the second linkage rule and forwards it to the home device via the gateway or the smart router, such as generating the prompt information "whether to generate a linkage rule 'the humidifier powers off when the air condition powers on'." This prompt information is then sent to the mobile phone of the user or another electronic device to view by the user. The user may operate based on the viewed prompt information to determine whether to generate the second linkage rule.

The Third Embodiment

FIG. 1 shows a flowchart of the method for controlling a smart home device based on linkage rules provided by the first embodiment of the application. The method comprises the following steps.

In step S101, a first linkage rule configured by a user is obtained, wherein the first linkage rule is use to control a first response device to enter into a first state based on a first parameter of a first condition device.

In step S102, a second state of the first response device is obtained, wherein the first response device comprises the first state and the second state;

In step S103, traversing of a plurality of linkage rules is performed to search linkage rules matching a second state of the first response device in the first linkage rule based on the second state of the first response device in the first linkage.

In step S104, a second linkage rule is generated based on a preset strategy in case that no linkage rule matching the second state is found, wherein the second linkage rule is use to control the first response device to enter into the second state based on a second parameter of a second condition device.

In an embodiment of the application, the method for controlling a smart home device based on linkage rules may be applied to a centre controlling device in the home such as a gateway, a smart router or a cloud controlling device, or be applied to other electronic devices with some processing capacities. The gateway, the smart router or the cloud controlling device can be used to control electronic devices connected thereto, such as air conditions, refrigerators, lamps, and so on. In the third embodiment of the application, taking the gateway or the smart router and the cloud controlling device collectively controlling the smart home devices as an example, a particular implementation of the method of the embodiment of the application will be described in detail.

Before step S101 of the embodiment of the application was performed, the method of embodiment of the application further comprises steps of:
connecting a plurality of smart home devices; and
obtaining device information of each one of the plurality of smart home devices;
wherein the device information particularly comprises the first parameter of the first condition device, the first state and the second state, and wherein the first condition device particularly comprises at least one smart home device determined from the plurality of smart home devices, the second condition device particularly comprises at least one smart home device determined from the plurality of smart home devices, the first response device particularly comprises at least one smart home device determined from the plurality of smart home devices.

In a particular implementation, the home devices need to be connected to the cloud controlling device via the gateway or the smart router. The gateway or the smart router may be provided with a parameter collection unit such as a sensors or a camera, so that the gateway or the smart router can monitor environment parameters of the home environment in real time. For example, the cloud controlling device connects to devices such as the doors, the windows, the lamps and the air conditions via the gateway or the smart router. Since the cloud controlling device connects to all the home devices via the gateway or the smart router, it can also obtain the device information of all the home devices. For example, the cloud controlling device may, via the gateway or the smart router, have knowledge that the states of a lamp comprise two states (power-on and power off), that the temperature control scope of the air condition is 16-30° C., that the states of a door comprise two states (open and close), and so on. The gateway or the smart router may further detect the environment parameters of the environment where a home device is located by means of a sensor mounted thereon. For example, a temperature sensor may detect that the temperature where the air condition is located is 30° C.

In the embodiment of the application, the first condition device, the second condition device and the first response device can be any one or more of the home devices. They may be the same, or may be different. For example, the door and window can be collectively determined as the first condition device, the door and the air condition can be determined as the second condition device, and the lamp can be determined as the first response device, etc. In a particular implementation, the user may make flexible configuration according to the actual usage requirement, which will not be limited in the embodiment of the application. The first parameter and the second parameter can be device states of the home devices or environment parameters of the environment where the home device is located. For example, when the first condition device is an air condition, the first parameter may be the power-on state and the power-off state of the air condition, or may be the current temperature of the environment where the air condition is located which may be detected by the gateway or the smart router, which will not be limited in the embodiment of the application.

In the embodiment of the application, considering an exemplary case where a door is the first condition device, an air condition is the second condition device and a humidifier is the first response device, a particular implementation of the method of the embodiment of the application will be described below.

Firstly, the step S101 of the method of the embodiment of the application is performed, i.e. a first linkage rule configured by a user is obtained, wherein the first linkage rule is use to control a first response device to enter into a first state based on a first parameter of a first condition device.

In a particular implementation, a cloud controlling device and the gateway or the smart router are used to collectively control smart home devices, a door is the first condition device, an air condition is the second condition device and a humidifier is the first response device as an example. The user can configure a linkage rules directly for the humidifier. For example, a linkage rule may specify that the humidifier powers on when the door opens. Then the humidifier may send this linkage rule to the gateway or the smart router which in turn stores this linkage rule to the cloud controlling device. Alternatively a portable device such as the mobile phone of the user is used to send the linkage rule "the humidifier powers on when the door opens" to the gateway or the smart router which in turn stores the received linkage rule to the cloud controlling device. The cloud controlling device may store a plurality of linkage rules for all of the home devices in a home.

After step S101 is performed, the method of the embodiment of the application performs step S102, i.e. obtaining a second state of the first response device, wherein the first response device comprises the first state and the second state.

In a particular implementation, still taking the above case as an example, when the cloud controlling device receives the linkage rule "the humidifier powers on when the door opens," it determines the humidifier as the first response device. Now the cloud controlling device retrieves device states corresponding to the humidifier from its own storage unit, i.e. power-on state and power-off state. The device state of the humidifier other than the power-on state (i.e. the power-off state) is determined as the second state.

After step S102 is performed, the method of the embodiment of the application performs step S103, i.e. traversing a plurality of linkage rules to search linkage rules matching the second state of the first response device in the first linkage rule.

In a particular implementation, taking the above case as an example, when the cloud controlling device determines that the second state of the humidifier is the power-off state, the cloud controlling device matches it with linkage rules stored in its own storage unit, and determines whether there is another linkage rule to control the humidifier to enter into the power off state.

After step S103 is performed, the method of the embodiment of the application performs step S104, i.e. generating a second linkage rule based on a preset strategy in case that no linkage rule matching the second state is found, wherein the second linkage rule is use to control the first response device to enter into the second state based on a second parameter of a second condition device.

In the embodiment of the application, there may be two implementations for step S104:
The First Implementation:
Referring to FIG. 2, the implementation of step S104 is provided as follows.
In step S10411, the smart home device corresponding to an execution condition parameter of any one of the plurality of linkage rules is selected as the second condition device.
In step S10412, the second parameter of the second condition device is obtained; and In step S10413, a second linkage rule for controlling the first response device to enter into the second state based on the second parameter is generated.

In a particular implementation, taking the above case as an example, when the cloud controlling device determines that none of the existing linkage rules can controls the humidifier to enter into the second state, the cloud controlling device can determine linkage rules associated with the humidifier from the plurality of linkage rules stored in its own storage unit, and can determine the home device corresponding to the execution condition in the associated linkage rules as the second condition device. For example, if one of the linkage rules stored in the cloud controlling device is "the humidifier powers on when the air condition powers off," the cloud controlling device may determine the air condition as the second condition device, or any of the linkage rules can be selected and the home device corresponding to the execution condition of the selected linkage rule may be determined as the second condition device, which will not be limited in the embodiment of the application. Then the device states of the air condition are obtained, which comprises the power-on state and the power-off state. The cloud controlling device may learn from the device information of the air condition that the air condition also has certain humidification capability. Accordingly the power-on state of the air condition is determined as the condition for controlling the humidifier to enter into the power-off state, and thus the second linkage rule "the humidifier powers off when the air condition powers on" is generated.

When the cloud controlling device determines that none of the existing linkage rules can controls the humidifier to enter into the second state, the cloud controlling device may select any of the linkage rules and the home device corresponding to the execution condition of the selected linkage rule may be determined as the second condition device. As an example, one of the linkage rule stored in the cloud controlling device is "the door is closed when the lamp power on." Then the lamp is determined as the second condition device. The cloud controlling device may learn from the device information of the lamp that there is no obvious relationship between the lamp and the humidifier, and then the cloud controlling device determines the humidity of the environment where the lamp is located, which is detected by a sensor of the gateway or the smart router, as the second parameter, and generates the second linkage rule "the humidifier powers on when the humidity of the environment where the lamp is located is below 30% RH."

The Second Implementation:

Referring to FIG. 3, the implementation of step S104 is provided as follows,

In step S10421, first usage information of the first response device during a first duration of time is obtained.

In step S10422, based on the first usage information, the parameter to which the second condition device corresponds when the second condition device is in the second state during the first duration of time as the second parameter is determined and selected as the second parameter.

In step S10423, a second linkage rule for controlling the first response device to enter into the second state based on the second parameter is generated.

In a particular implementation, taking the above case as an example, when the cloud controlling device determines that none of the existing linkage rules can controls the humidifier to enter into the second state, the cloud controlling device sends to the gateway or the smart router an instruction for viewing the usage information of the humidifier in the latest month, and the gateway or the smart router learns, from the usage information of the humidifier in the latest month which is store in the storage unit of the gateway or the smart router, the parameter information of other home devices when the humidifier is in the power-off state. For example, the usage information of the humidifier stored in the gateway or the smart router shows that the states corresponding to the air condition are always power-on state when the humidifier is in the power-off state. Then the gateway or the smart router generates the second linkage rule "the humidifier powers off when the air condition powers on" and sends the second linkage rule to the cloud controlling device.

After step S104 is performed, the method of the embodiment of the application may further comprises:
based on the second linkage rule, generating and outputting first prompt information for prompting the user to confirm whether the generated second linkage rule should be saved or not, wherein the first prompt information contains the second linkage rule.

In a particular implementation, taking the above case as an example, when the cloud controlling device generates the second linkage rule corresponding to the humidifier, the cloud controlling device may generates prompt information containing the second linkage rule and forwards it to the home device via the gateway or the smart router, such as generating the prompt information "whether to generate a linkage rule 'the humidifier powers off when the air condition powers on'." This prompt information is then sent to the mobile phone of the user or another electronic device to view by the user. The user may operate based on the viewed prompt information to determine whether to generate the second linkage rule or not.

The Fourth Embodiment

Figure 4:
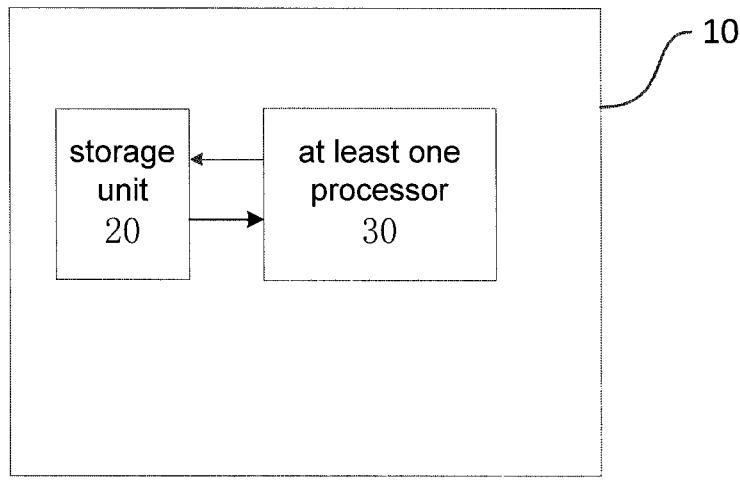
FIG. 4 is a structural block diagram of a control apparatus of the fourth embodiment of the application.

Based on the same inventive idea as that of the first embodiment, the fourth embodiment of the application provides a control apparatus which, referring to FIG. 4, comprises: a housing 10; a storage unit 20 arranged in the housing 10, operative for storing at least one program modules; and at least one processor 30 arranged in the housing 10.

The at least one processor 30, by obtaining and running the at least one program modules, is operative to: obtain a first linkage rule configured by a user, wherein the first linkage rule is use to control a first response device to enter into a first state based on a first parameter of a first condition device; obtain a second state of the first response device, wherein the first response device comprises the first state and the second state; traverse a plurality of linkage rules to search linkage rules matching the second state of the first response device in the first linkage rule; and generate a second linkage rule based on a preset strategy in case that no linkage rule matching the second state is found, wherein the second linkage rule is use to control the first response device to enter into the second state based on a second parameter of a second condition device.

Optionally, before the at least one processor 30 obtains the first linkage rule configured by the user, the at least one processor 30 further operative to: connect a plurality of smart home devices; and obtain device information of each one of the plurality of smart home devices, wherein the device information particularly comprises the first parameter of the first condition device, the first state and the second state, the first condition device particularly comprises at least one smart home device determined from the plurality of smart home devices, the second condition device particularly comprises at least one smart home device determined from the plurality of smart home devices, the first response device particularly comprises at least one smart home device determined from the plurality of smart home devices.

Optionally, the at least one processor is particularly operative to: determine the smart home device corresponding to an execution condition parameter of any one of the plurality of linkage rules as the second condition device; obtain the second parameter of the second condition device; and generate the second linkage rule for controlling the first response device to enter into the second state based on the second parameter.

Optionally, the at least one processor is particularly operative to: obtain first usage information of the first response device during a first duration of time; determine, based on the first usage information, the parameter to which the second condition device corresponds when the second condition device is in the second state during the first duration of time and select the parameter as the second parameter; and generate a second linkage rule for controlling the first response device to enter into the second state based on the second parameter.

Optionally, after a second linkage rule is generated based on a preset strategy in case that no linkage rule matching the second state is found, the at least one processor is further operative to: based on the second linkage rule, generate and output first prompt information for prompting the user to confirm whether the generated second linkage rule should be saved or not, wherein the first prompt information contains the second linkage rule.

The following one or more technical effects can be achieved by the one or more solutions of the embodiments of the application.

1. In the above solutions of the embodiments of the application, the following technical means is adopted: obtaining a first linkage rule configured by a user, wherein the first linkage rule is use to control a first response device to enter into a first state based on a first parameter of a first condition device, obtaining a second state of the first response device, and traversing a plurality of linkage rules to search linkage rules matching the second state of the first response device in the first linkage rule. As such, when the electronic device obtains a linkage rule, it will automatically traverse all of linkage rules stored in the electronic device to search linkage rules related to the device states of the response device in the obtained linkage rule. As such, the electronic device can detect whether the stored linkage rules cover all the device states of the response device, and thus judge the completeness of the linkage rules. Such a solution efficiently addresses the technical problem of the electronic device in the art that it cannot detect whether the configured linkage rules cover all of the device states of the electronic device, and achieves the technical effect of automatically detecting the completeness of the configured linkage rules.

2. In the above solutions of the embodiments of the application, the following technical means is adopted: obtaining a first linkage rule configured by a user, wherein the first linkage rule is use to control a first response device to enter into a first state based on a first parameter of a first condition device, obtaining a second state of the first response device, wherein the first response device comprises the first state and the second state, traversing a plurality of linkage rules to search linkage rules matching the second state of the first response device in the first linkage rule, and generating a second linkage rule based on a preset strategy in case that no linkage rule matching the second state is found, wherein the second linkage rule is use to control the first response device to enter into the second state based on a second parameter of a second condition device. As such, when the electronic device has detected that the linkage rules are not complete, a second linkage rule corresponding to the second state is generated based on a preset strategy, so as to compensate the linkage rules. This solution efficiently addresses the technical problem of the electronic device in the prior art that the rule corresponding to the uncovered device state cannot be generated automatically, and achieves the technical effect of automatically generating the linkage rule corresponding to the uncovered device state.

3. In the above solutions of the embodiments of the application, the following technical means is adopted: traversing a plurality of linkage rules to search linkage rules matching the second state of the first response device in the first linkage rule, and generating a second linkage rule based on a preset strategy in case that no linkage rule matching the second state is found, wherein the second linkage rule is use to control the first response device to enter into the second state based on a second parameter of a second condition device. As such, the electronic device can automatically generate the linkage rule corresponding to the device state missed by the user without any manual operation of the user, and thus improves the efficiency for configuring the linkage rules and eliminates the missing error. This solution efficiently solves the technical problems of the electronic device in the prior art that it is difficult to use and has a bad user experience, and achieves the technical effect of improving the user experience.

As those skilled in the art will appreciate, the embodiments of the disclosure may be provided as methods, systems or computer program products. Thus, the disclosure may be embodied as hardware, software or a combination of software and hardware. In addition, the disclosure may be embodied as computer program products that are implemented on one or more computer-usable storage mediums (including but not limited to magnetic disk storage, optical storage, etc.) containing computer-usable program codes.

The disclosure is described by referring to flowcharts and/or block diagrams of the methods, devices (systems) and computer program products according to the embodiments of the disclosure. It shall be understood that each flow and/or block in the flowcharts and/or block diagrams or a combination of flows and/or blocks in the flowcharts and/or block diagrams may be implemented by computer program instructions. These computer program instructions may be provided to a general-purpose computer, a specific-purpose computer, an embedded processor or some other programmable data processing device to create a machine, so that the instructions, which are executed by the processor of the computer or the programmable data processing device, create a device for realizing functions specified in one or more flows in the flowcharts and/or one or more blocks in the block diagrams.

The computer program instructions may also be stored in a computer-readable storage that can direct a computer or some other programmable data processing device to work in a specific manner, so that the instructions stored in the computer-readable storage create an article of manufacture which comprises instruction means for realizing functions specified in one or more flows in the flowcharts and/or one or more blocks in the block diagrams.

The computer program instructions may also be loaded on a computer or some other programmable data processing device, so that a series of operations are executed on the computer or the programmable data processing device to generate computer-implemented processes. As such, the instructions executed on the computer or the programmable data processing device provide steps for realizing functions specified in one or more flows in the flowcharts and/or one or more blocks in the block diagrams Particularly, the computer program instructions corresponding to the method for controlling a smart home device based on linkage rules of the embodiment of the application may be stored on storage mediums such as optical disc, hard disc, USB flash disc, and so on. When the computer program instructions in the storage medium which corresponds to the information processing method are read or performed by an electronic device, the electronic device is configured to perform the steps of:

obtaining a first linkage rule configured by a user, wherein the first linkage rule is use to control a first response device to enter into a first state based on a first parameter of a first condition device;

obtaining a second state of the first response device, wherein the first response device comprises the first state and the second state;

traversing a plurality of linkage rules to search linkage rules matching the second state of the first response device in the first linkage rule; and generating a second linkage rule based on a preset strategy in case that no linkage rule matching the second state is found, wherein the second linkage rule is use to control the first response device to enter into the second state based on a second parameter of a second condition device.

Optionally, the computer instructions stored in the storage mediums further comprises instructions for performing step of: before obtaining a first linkage rule configured by a user, connecting a plurality of smart home devices; and obtaining device information of each one of the plurality of smart home devices;

wherein the device information comprises the first parameter of the first condition device, the first state and the second state, and wherein the first condition device comprises at least one smart home device determined from the plurality of smart home devices, the second condition device comprises at least one smart home device determined from the plurality of smart home devices, the first response device comprises at least one smart home device determined from the plurality of smart home devices.

Optionally, the computer instructions stored in the storage mediums and corresponding to the step of generating a second linkage rule based on a preset strategy in case that no linkage rule matching the second state is found, in a particular process of its execution, particularly comprise the following step:

selecting a smart home device corresponding to an execution condition parameter of any one of the plurality of linkage rules as the second condition device;

obtaining the second parameter of the second condition device; and generating a second linkage rule for controlling the first response device to enter into the second state based on the second parameter.

Optionally, the computer instructions stored in the storage mediums further comprises instructions for performing step of: after a second linkage rule based on a preset strategy in case that no linkage rule matching the second state is found, based on the second linkage rule, generating and outputting first prompt information for prompting the user to confirm whether the generated second linkage rule should be saved or not, wherein the first prompt information contains the second linkage rule.

Generally, the embodiments of the application provide a method and apparatus for controlling a smart home device based on linkage rules to address the technical problem of the electronic device in the prior art that it cannot detect whether the configured linkage rules cover all the device states of the electronic device and achieves the technical effect of automatically detecting the completeness of the configured linkage rules.

Though the preferable embodiments of the application have been described, other alterations and modifications can be made once one with ordinary skills in the art knows the basic inventive idea. Therefore, the appended claims should be interpreted as including the preferable embodiments and all the alterations and modifications falling into the scope of the application.

Obviously, one with ordinary skills in the art can make alterations and modifications without departing from the spirit and scope of the application. As such, if these alterations and modifications of the application fall into the scope of the claims of the application and equivalents thereof, the application intends to contain these alterations and modifications.

I claim:

1. A method for controlling smart home device, comprising:

obtaining a first linkage rule for controlling a first response device to enter into a first state based on a first parameter of a first condition device;

traversing, based on all second states of the first response device different from the first state, a plurality of linkage rules to determine whether the linkage rules comprise at least one linkage rule that matches the second states of the first response device and to determine whether the plurality of linkage rules cover all states of the first response device and generate completeness judgment of the plurality of linkage rules; and generating a second linkage rule based on a preset strategy in case that the completeness judgment indicates that the plurality of linkage rules comprise no linkage rule matching the second states of the first response device, wherein the second linkage rule is operable to control the first response device to enter into the second states based on a second parameter of a second condition device.

2. The method of claim 1, wherein, before obtaining the first linkage rule, the method further comprising:

connecting a plurality of smart home devices; and obtaining device information of each one of the plurality of smart home devices;

wherein the device information comprises the first parameter of the first condition device, the first state and the second states of the first response device, and wherein each of the first condition device, the second condition device and the first response device comprises at least one smart home device determined from the plurality of smart home devices.

3. The method of claim 2, wherein generating the second linkage rule based on a preset strategy in case that the plurality of linkage rules comprise no linkage rule matching the second states of the first response device comprises:

selecting a smart home device corresponding to an execution condition parameter of any one of the plurality of linkage rules as the second condition device; and generating the second linkage rule for controlling the first response device to enter into the second states based on a second parameter of the second condition device.

4. The method of claim 2, wherein generating the second linkage rule based on the preset strategy in case that the plurality of linkage rules comprise no linkage rule matching the second states of the first response device comprises:

obtaining first usage information of the first response device during a first duration of time;

determining, based on the first usage information, a parameter to which the second condition device corresponds when the second condition device is in the second states during the first duration of time and selecting the parameter as the second parameter; and generating the second linkage rule for controlling the first response device to enter into the second states based on the second parameter.

5. The method of claim 3, wherein after generating the second linkage rule based on the preset strategy in case that the plurality of linkage rules comprise no linkage rule matching the second states of the first response device, the method further comprises:

based on the second linkage rule, generating and outputting first prompt information for prompting the user to create the second linkage rule corresponding to the second states, wherein the first prompt information contains the second linkage rule.

6. A control apparatus comprising:

a housing;

a storage for storing at least one program modules;

at least one processor arranged in the housing, the at least one processor, by obtaining and running the at least one program modules, being configured to obtain a first linkage rule for controlling a first response device to enter into a first state based on a first parameter of a first condition device;

traverse, based on all second states of the first response device different from the first state, a plurality of linkage rules to determine whether the linkage rules comprise at least one linkage rule that matches the second states of the first response device and to determine whether the plurality of linkage rules cover all states of the first response device and generate completeness judgment of the plurality of linkage rules; and generate a second linkage rule based on a preset strategy in case that the completeness judgment indicates that the plurality of linkage rules comprise no linkage rule matching the second states of the first response device, wherein the second linkage rule is operable to control the first response device to enter into the second states based on a second parameter of a second condition device.

7. The apparatus of claim 6, wherein, the at least one processor is further configured to, before obtaining the first linkage rule:

connect a plurality of smart home devices; and obtain device information of each one of the plurality of smart home devices;

wherein the device information comprises the first parameter of the first condition device, the first state and the second states of the first response device, and wherein each of the first condition device, the second condition device and the first response device comprises at least one smart home device determined from the plurality of smart home devices.

8. The apparatus of claim 7, wherein the at least one processor is further configured to:

select a smart home device corresponding to an execution condition parameter of any one of the plurality of linkage rules as the second condition device; and generate the second linkage rule for controlling the first response device to enter into the second states based on a second parameter of the second condition device.

9. The apparatus of claim 7, the at least one processor is further configured to:

obtain first usage information of the first response device during a first duration of time;

determine, based on the first usage information, a parameter to which the second condition device corresponds when the second condition device is in the second states during the first duration of time and select the parameter as the second parameter; and generate the second linkage rule for controlling the first response device to enter into the second states based on the second parameter.

10. The apparatus of claim 8, wherein the at least one processor is further configured to, after the second linkage rule is generated based on a preset strategy in case that no linkage rule matching the second states is found, generate, based on the second linkage rule, and output first prompt information for prompting the user to create the second linkage rule corresponding to the second states, wherein the first prompt information contains the second linkage rule.

\* \* \* \* \*